US008721449B2

(12) United States Patent
Johnson et al.

(10) Patent No.: US 8,721,449 B2
(45) Date of Patent: May 13, 2014

(54) METHOD AND SYSTEM FOR PARAGAME ACTIVITY AT ELECTRONIC GAMING MACHINE

(75) Inventors: Sam Johnson, Las Vegas, NV (US); Herbert W. Stokes, Jr., Reno, NV (US); Robert W. Smalley, Jr., Las Vegas, NV (US); Simon Sirin, Las Vegas, NV (US); Danny Patrick Daley, Reno, NV (US); Chad A. Ryan, Henderson, NV (US); Bradley G. Ward, Henderson, NV (US)

(73) Assignee: Tipping Point Group, LLC, Las Vegas, NV (US)

( * ) Notice: Subject to any disclaimer, the term of this patent is extended or adjusted under 35 U.S.C. 154(b) by 1179 days.

(21) Appl. No.: 11/897,533

(22) Filed: Aug. 30, 2007

(65) Prior Publication Data

US 2008/0113773 A1 May 15, 2008

Related U.S. Application Data

(63) Continuation-in-part of application No. 11/686,755, filed on Mar. 15, 2007, which is a continuation-in-part of application No. 11/468,946, filed on Aug. 31, 2006, which is a continuation-in-part of application No. 10/689,407, filed on Oct. 20, 2003, now Pat. No. 7,335,106.

(51) Int. Cl.
*A63F 9/24* (2006.01)
*A63F 13/00* (2006.01)

(52) U.S. Cl.
USPC .................... 463/42; 463/25; 463/29; 463/31

(58) Field of Classification Search
USPC .................................. 463/25, 42, 47, 16, 20
See application file for complete search history.

(56) References Cited

U.S. PATENT DOCUMENTS

| | | | | | |
|---|---|---|---|---|---|
| 4,004,097 | A * | 1/1977 | Spaulding | ................ | 379/106.04 |
| 4,261,012 | A | 4/1981 | Maloomian | | |
| 4,357,624 | A | 11/1982 | Greenberg | | |
| 4,503,429 | A | 3/1985 | Schreiber | | |
| 4,521,014 | A | 6/1985 | Sitrick | | |
| 4,527,798 | A * | 7/1985 | Siekierski et al. | .............. | 463/17 |
| 4,694,490 | A | 9/1987 | Harvey et al. | | |
| 4,704,725 | A | 11/1987 | Harvey et al. | | |
| 4,710,873 | A | 12/1987 | Breslow et al. | | |
| 4,743,022 | A | 5/1988 | Wood | | |
| 4,926,327 | A * | 5/1990 | Sidley | ............................ | 463/13 |
| 4,965,825 | A | 10/1990 | Harvey et al. | | |
| 5,105,184 | A | 4/1992 | Pirani et al. | | |
| 5,121,477 | A | 6/1992 | Koopmans et al. | | |

(Continued)

FOREIGN PATENT DOCUMENTS

| | | |
|---|---|---|
| EP | 0946028 | 9/1999 |
| WO | WO 02/055163 | 7/2002 |

(Continued)

*Primary Examiner* — Steven J Hylinski
(74) *Attorney, Agent, or Firm* — Weide & Miller, Ltd.

(57) ABSTRACT

The provision of a paragaming event on an electronic gaming machine is provided by intercepting a cashout event, identifying the account balance and presenting an offer to participate in the paragaming event. If the customer agrees, the account balance is appropriately reduced and a voucher in followed by a cashout event is initiated to maintain a record of the transaction. A cash voucher and a transaction receipt are then printed for the customer.

18 Claims, 6 Drawing Sheets

(56) References Cited

U.S. PATENT DOCUMENTS 5,233,423 A 8/1993 Jernigan et al.
5,429,361 A * 7/1995 Raven et al. .................... 463/25
5,470,079 A 11/1995 LeStrange et al.
5,477,952 A 12/1995 Castellano et al.
5,531,441 A 7/1996 Dabrowski et al.
5,553,864 A 9/1996 Sitrick
5,559,312 A 9/1996 Lucero
5,586,936 A 12/1996 Bennett et al.
5,613,912 A 3/1997 Slater
5,655,961 A 8/1997 Acres et al.
5,678,679 A 10/1997 Berman
5,740,549 A 4/1998 Reilly et al.
5,761,647 A 6/1998 Boushy
5,774,873 A 6/1998 Berent et al.
5,785,592 A 7/1998 Jacobsen
5,813,912 A 9/1998 Shultz
5,816,918 A 10/1998 Kelly et al.
5,830,065 A 11/1998 Sitrick
5,887,243 A 3/1999 Harvey et al.
5,907,321 A 5/1999 Grossman et al.
5,919,090 A * 7/1999 Mothwurf ...................... 463/25
5,941,772 A 8/1999 Paige
5,971,271 A 10/1999 Wynn et al.
5,990,927 A 11/1999 Hendricks et al.
6,003,013 A 12/1999 Boushy et al.
6,012,832 A * 1/2000 Saunders et al. .............. 235/375
6,015,344 A * 1/2000 Kelly et al. .................... 463/16
6,049,823 A 4/2000 Hwang
6,068,552 A 5/2000 Walker et al.
6,089,975 A 7/2000 Dunn
6,113,495 A 9/2000 Walker et al.
6,142,876 A 11/2000 Cumbers
6,175,358 B1 1/2001 Scott-Jackson et al.
6,186,893 B1 2/2001 Walker et al.
6,203,428 B1 3/2001 Giobbi et al.
6,234,900 B1 5/2001 Cumbers
6,244,957 B1 6/2001 Walker et al.
6,251,014 B1 * 6/2001 Stockdale et al. .............. 463/16
6,253,119 B1 6/2001 Dabrowski
6,263,258 B1 7/2001 Dabrowski
6,280,318 B1 8/2001 Criss-Puszkiewicz
6,280,326 B1 8/2001 Saunders
6,302,793 B1 10/2001 Fertitta, III et al.
6,315,666 B1 11/2001 Mastera et al.
6,368,216 B1 4/2002 Hedrick et al.
6,375,567 B1 4/2002 Acres
6,379,246 B1 4/2002 Debrowski
6,379,247 B1 4/2002 Walker et al.
6,390,917 B1 5/2002 Walker et al.
6,425,825 B1 7/2002 Sitrick
6,443,456 B1 9/2002 Gajor
6,459,440 B1 10/2002 Monnes et al.
6,460,848 B1 10/2002 Soltys et al.
6,500,067 B1 12/2002 Luciano et al.
6,503,147 B1 1/2003 Stockdale et al.
6,508,710 B1 1/2003 Paravia et al.
6,517,435 B2 2/2003 Soltys et al.
6,517,436 B2 2/2003 Soltys et al.
6,520,857 B2 2/2003 Soltys et al.
6,527,271 B2 3/2003 Soltys et al.
6,530,836 B2 3/2003 Soltys et al.
6,530,837 B2 3/2003 Soltys et al.
6,533,276 B2 3/2003 Soltys et al.
6,533,662 B2 3/2003 Soltys et al.
6,540,609 B1 4/2003 Paige
6,579,179 B2 6/2003 Poole et al.
6,579,180 B2 6/2003 Soltys et al.
6,579,181 B2 6/2003 Soltys et al.
6,582,310 B1 6/2003 Walker et al.
6,592,456 B2 7/2003 Walker et al.
6,595,857 B2 7/2003 Soltys et al.
6,598,788 B1 7/2003 Dabrowski
6,620,046 B2 9/2003 Rowe
6,638,163 B2 10/2003 Moody
6,641,483 B1 11/2003 Luciano
6,645,068 B1 11/2003 Kelly et al.
6,648,757 B1 11/2003 Slomiany et al.
6,652,380 B1 11/2003 Luciano
6,663,490 B2 12/2003 Soltys et al.
6,672,589 B1 1/2004 Lemke et al.
6,676,515 B1 1/2004 Baltz et al.
6,679,775 B1 1/2004 Luciano et al.
6,682,423 B2 1/2004 Brosnan et al.
6,685,559 B2 2/2004 Luciano et al.
6,712,696 B2 3/2004 Soltys et al.
6,712,698 B2 3/2004 Paulsen et al.
6,722,978 B2 4/2004 Valenti
6,729,956 B2 5/2004 Wolf et al.
6,743,095 B2 * 6/2004 Cole et al. ....................... 463/25
6,749,510 B2 6/2004 Giobbi
6,758,751 B2 7/2004 Soltys et al.
6,800,029 B2 10/2004 Rowe et al.
6,843,723 B2 1/2005 Joshi
6,848,995 B1 2/2005 Walker et al.
6,852,029 B2 2/2005 Baltz et al.
6,863,611 B1 3/2005 Morrow et al.
6,884,174 B2 4/2005 Lundy et al.
6,890,256 B2 5/2005 Walker et al.
6,896,618 B2 5/2005 Benoy et al.
6,908,384 B1 6/2005 Luciano, Jr.
6,916,246 B1 7/2005 Luciano, Jr.
6,924,903 B2 8/2005 Brooks et al.
6,935,946 B2 8/2005 Yoseloff
6,942,574 B1 9/2005 LeMay et al.
6,958,014 B1 10/2005 Luciano, Jr. et al.
6,984,174 B2 * 1/2006 Cannon et al. .................. 463/25
6,991,543 B2 1/2006 Joshi
7,004,837 B1 2/2006 Crowder, Jr. et al.
7,022,017 B1 4/2006 Halbritter et al.
7,025,676 B2 * 4/2006 Cole et al. ....................... 463/25
7,063,617 B2 6/2006 Brosnan et al.
7,070,503 B2 7/2006 Rudolph
7,094,149 B2 8/2006 Walker et al.
7,112,138 B2 9/2006 Hedrick et al.
7,118,478 B2 * 10/2006 Fayter et al. .................... 463/25
7,137,889 B1 11/2006 Luciano
7,137,892 B2 11/2006 Sitrick
7,241,219 B2 7/2007 Walker et al.
7,255,351 B2 * 8/2007 Yoseloff et al. ............... 273/274
7,285,049 B1 10/2007 Luciano, Jr. et al.
7,290,072 B2 * 10/2007 Quraishi et al. .............. 710/105
7,297,062 B2 11/2007 Gatto et al.
7,322,885 B1 1/2008 Luciano, Jr. et al.
7,357,714 B2 * 4/2008 Tessmer et al. ................. 463/16
7,392,470 B2 * 6/2008 Kammler ...................... 715/234
7,473,179 B2 * 1/2009 Xidos et al. ..................... 463/29
7,520,810 B2 4/2009 Dabrowski
7,674,177 B2 * 3/2010 Cole .............................. 463/25
7,704,147 B2 * 4/2010 Quraishi et al. ................ 463/42
7,771,271 B2 * 8/2010 Walker et al. ................... 463/25
7,819,750 B2 * 10/2010 Lam et al. ....................... 463/43
7,827,488 B2 11/2010 Sitrick
7,867,086 B2 1/2011 Sitrick
8,133,102 B2 3/2012 Dabrowski
2002/0016202 A1 2/2002 Fertitta et al.
2002/0025850 A1 2/2002 Hafezi
2002/0142841 A1 10/2002 Boushy
2002/0147047 A1 10/2002 Letovsky et al.
2002/0169021 A1 11/2002 Urie et al.
2002/0177479 A1 11/2002 Walker et al.
2002/0177480 A1 11/2002 Rowe
2002/0198044 A1 12/2002 Walker et al.
2003/0004871 A1 1/2003 Rowe
2003/0013512 A1 1/2003 Rowe
2003/0013513 A1 1/2003 Rowe
2003/0013516 A1 1/2003 Walker et al.
2003/0013527 A1 * 1/2003 Rowe et al. ..................... 463/42
2003/0027631 A1 2/2003 Hedrick et al.
2003/0032474 A1 2/2003 Kaminkow
2003/0036425 A1 2/2003 Kaminkow et al.
2003/0054868 A1 3/2003 Paulsen et al.
2003/0054880 A1 * 3/2003 Lam et al. ....................... 463/29
2003/0054881 A1 3/2003 Hedrick et al.
2003/0064800 A1 4/2003 Jackson et al.

(56) References Cited

U.S. PATENT DOCUMENTS

2003/0083943 A1 5/2003 Adams et al.
2003/0096645 A1 5/2003 Soltys et al.
2003/0100359 A1 5/2003 Loose et al.
2003/0119579 A1 6/2003 Walker et al.
2003/0139214 A1* 7/2003 Wolf et al. .................... 463/42
2003/0149619 A1 8/2003 Stanley et al.
2003/0162588 A1 8/2003 Brosnan et al.
2003/0187736 A1 10/2003 Teague et al.
2003/0195036 A1 10/2003 Poole et al.
2003/0207711 A1 11/2003 Rowe
2003/0216169 A1 11/2003 Walker et al.
2003/0216966 A1 11/2003 Saenz et al.
2003/0232647 A1 12/2003 Moser
2004/0024608 A1 2/2004 Saenz et al.
2004/0032086 A1 2/2004 Barragan
2004/0038735 A1 2/2004 Steil
2004/0039679 A1 2/2004 Norton et al.
2004/0039695 A1 2/2004 Rowe
2004/0043814 A1* 3/2004 Angell et al. ................. 463/25
2004/0053663 A1 3/2004 Paulsen
2004/0077408 A1 4/2004 D'Amico et al.
2004/0092303 A1 5/2004 George et al.
2004/0092315 A1 5/2004 Boyd et al.
2004/0106449 A1* 6/2004 Walker et al. ................. 463/25
2004/0113360 A1 6/2004 George et al.
2004/0127284 A1 7/2004 Walker et al.
2004/0132531 A1 7/2004 George et al.
2004/0132532 A1 7/2004 Brosnan et al.
2004/0142739 A1 7/2004 Loose et al.
2004/0143496 A1 7/2004 Saenz
2004/0209674 A1 10/2004 Conover et al.
2004/0214622 A1 10/2004 Atkinson
2004/0219975 A1 11/2004 Soltys et al.
2004/0254006 A1* 12/2004 Lam et al. ..................... 463/16
2004/0254009 A1 12/2004 D'Amico et al.
2004/0254013 A1* 12/2004 Quraishi et al. ............... 463/29
2004/0254014 A1* 12/2004 Quraishi et al. ............... 463/29
2005/0003890 A1 1/2005 Hedrick et al.
2005/0009600 A1 1/2005 Rowe et al.
2005/0013527 A1 1/2005 Doyle et al.
2005/0014558 A1 1/2005 Estey
2005/0027381 A1 2/2005 George et al.
2005/0032575 A1 2/2005 Goforth et al.
2005/0037837 A1 2/2005 Rowe
2005/0054439 A1 3/2005 Rowe et al.
2005/0054446 A1 3/2005 Kammler et al.
2005/0059457 A1 3/2005 Rothschild et al.
2005/0059480 A1 3/2005 Soukup et al.
2005/0059485 A1 3/2005 Paulsen et al.
2005/0075165 A1 4/2005 George et al.
2005/0075889 A1 4/2005 Gomes et al.
2005/0085300 A1 4/2005 Johnson
2005/0096112 A1 5/2005 Guinn, Jr. et al.
2005/0096129 A1 5/2005 Walker et al.
2005/0119044 A1 6/2005 Lim et al.
2005/0119048 A1 6/2005 Soltys et al.
2005/0119052 A1 6/2005 Russell et al.
2005/0137011 A1 6/2005 Walker et al.
2005/0143166 A1 6/2005 Walker et al.
2005/0153768 A1 7/2005 Paulsen
2005/0153773 A1 7/2005 Nguyen et al.
2005/0170883 A1 8/2005 Muskin
2005/0170892 A1 8/2005 Atkinson
2005/0171808 A1 8/2005 Saenz et al.
2005/0182647 A1 8/2005 Saenz et al.
2005/0187012 A1 8/2005 Walker et al.
2005/0197183 A1 9/2005 Walker et al.
2005/0215310 A1 9/2005 Boyd et al.
2005/0215316 A1 9/2005 Rowe et al.
2006/0019747 A1 1/2006 Loose et al.
2006/0025206 A1 2/2006 Walker et al.
2006/0046819 A1 3/2006 Nguyen et al.
2006/0068906 A1 3/2006 Morrow et al.
2006/0073870 A1 4/2006 Cannon
2006/0084488 A1* 4/2006 Kinsley et al. ................ 463/16
2006/0135230 A1 6/2006 Godse et al.
2006/0135255 A1* 6/2006 Roth ............................ 463/25
2006/0154719 A1 7/2006 Okuniewicz
2006/0154721 A1 7/2006 Okuniewicz
2006/0178208 A1* 8/2006 Cole ............................ 463/25
2006/0211477 A1 9/2006 Walker et al.
2006/0247027 A1 11/2006 Walker et al.
2006/0252504 A1 11/2006 Walker et al.
2006/0252505 A1 11/2006 Walker et al.
2006/0287063 A1 12/2006 Walker et al.
2007/0015569 A1 1/2007 Norton et al.
2007/0105617 A1 5/2007 Walker et al.
2007/0121936 A1 5/2007 Guillou et al.
2007/0129137 A1 6/2007 Walker et al.
2007/0213124 A1 9/2007 Walker et al.
2007/0259709 A1 11/2007 Kelly et al.
2007/0265060 A1 11/2007 Hornik et al.
2008/0009344 A1* 1/2008 Graham et al. ................ 463/25
2008/0026816 A1 1/2008 Sammon et al.
2008/0039190 A1 2/2008 Walker et al.
2009/0291736 A1 11/2009 Walker et al.

FOREIGN PATENT DOCUMENTS

WO WO 03/089082 10/2003
WO WO 03/093986 11/2003
WO WO 2005/070509 8/2005

* cited by examiner

METHOD AND SYSTEM FOR PARAGAME ACTIVITY AT ELECTRONIC GAMING MACHINE

CROSS-REFERENCE TO RELATED APPLICATIONS

This application is a continuation-in-part of U.S. patent application Ser. No. 11/686,755, filed Mar. 15, 2007, entitled AUTOMATIC FUNDING OF PARAGAMES ON ELECTRONIC GAMING PLATFORM, which is a continuation-in-part of U.S. patent application Ser. No. 11/468,946, filed on Aug. 31, 2006, entitled CLOSED-LOOP SYSTEM FOR PROVIDING ADDITIONAL EVENT PARTICIPATION TO ELECTRONIC VIDEO GAME CUSTOMERS, which is a continuation-in-part of U.S. patent application Ser. No. 10/689,407, filed on Oct. 20, 2003, now U.S. Pat. No. 7,335,106 entitled CLOSED-LOOP SYSTEM FOR DISPLAYING PROMOTIONAL EVENTS AND GRANTING AWARDS FOR ELECTRONIC VIDEO GAMES.

BACKGROUND OF THE INVENTION

The gaming industry continues to advance by exploiting the relatively recent technology advancements, such as networking and communication technology advancements. However, as in most industries, some of the technological advances are introduced by specific companies for specific purposes. As a result, these technological advancements are functionally ideal for the purpose to which they were intended. However, when these technological advances are viewed with a creative eye, they may also result in opening the door for other potential uses. An example of this phenomenon is clearly shown by examining a NASA invention that was designed for use with space suits. During the Apollo program, a super-absorbent fabric was developed to absorb excreted body fluids within a space suit. The fabric was able to hold up to 400 times its own weight. This fabric was developed in an effort to enable Apollo astronauts to conduct spacewalks for six or more hours. Ultimately, the technology advancement has greatly influenced the present disposable diaper industry. However, considerable engineering was required to go from an absorbent fabric to a usable disposable diaper.

Similarly, application of some of the advancements introduced into the electronic gaming industry, when examined under the scrutiny of a creative and curious mind, give rise to uses that were not intended when the technology was introduced. Often times, when implementing such new uses, the implementers are met with obstacles such as incompatibilities, partial functionality, and needs for tweaks or modifications. In some situations, these obstacles can be easily overcome. However, in other situations, overcoming the obstacles may be quite costly, commercially infeasible, or technologically impractical.

One of the technological advancements in the electronic gaming machine industry has been the development and deployment of the Slot Accounting System (SAS) protocol. This protocol enables a uniform interface to various slot machines or electronic gaming machines so that accounting operations can be performed. In many casinos, the SAS protocol is exploited by the use of a Slot Machine Interface Board (SMIB). In this configuration, the SMIB operates to interface to the gaming machines using the SAS protocol and then to the casino's accounting software, typically running on a server, to perform accounting operations. Thus, the use of SAS and SMIBs enables any electronic gaming machine manufacture to develop a machine that includes a SAS port that can be compatible with the casinos slot accounting system—essentially enabling the casino to have machines from multiple vendors while the SMIB normalizes the slot floor.

This technological advancement has been instrumental in the electronic gaming machine industry. However, as described above, this technology has given rise to other uses by the creative minds that have developed the inventions described herein or at a minimum, has been viewed as a component in resolving novel configurations that are used to enhance the use of electronic gaming machines.

Las Vegas Gaming, Inc. is in the business of creating new and useful improvements and advancements in the electronic gaming industry. Some of the aspects of these advancements have been described in United States patent applications Serial Numbers (1) Ser. No. 10/689,407 filed on Oct. 20, 2003 and having a title of CLOSED-LOOP SYSTEM FOR DISPLAYING PROMOTIONAL EVENTS AND GRANTING AWARDS FOR ELECTRONIC VIDEO GAMES; (2) Ser. No. 10/113,882 filed on Apr. 1, 2002 and having a title of INTERACTIVE VIDEO SYSTEM; (3) Ser. No. 11/468,946 filed on Aug. 31, 2006 and having a title of CLOSED-LOOP SYSTEM FOR PROVIDING ADDITIONAL EVENT PARTICIPATION TO ELECTRONIC VIDEO GAME CUSTOMERS; and (4) Ser. No. 11/470,253 filed on Sep. 6, 2006 and having a title of MOBILE OPERATION OF VIDEO GAMING MACHINES, all of which are incorporated herein by reference. One of the inventive aspects disclosed in these references include the provision of paragaming activities, such as viewing sporting events, participating in other games, participating in promotional events, etc. Paragaming, as used herein, can be construed to mean a game, event, activity, advertisement, entertainment, or the like that can be made available to a user of an electronic gaming machine but which is parasitically added to or implemented on an electronic gaming machine by software of devices that are added to the electronic gaming machine and/or that operates, at least in part, independently from the underlying game of the game machine. For instance, paragaming may include payout tables or winning criteria that is different than the payout table of the underlying game, may include a different theme, and/or may even have no correlation whatsoever with the underlying game. Thus, paragaming can take on a variety of characteristics such as simply providing additional payout options that are based on the operation of the underlying game or, could be the display of entertainment content.

As described in the above-referenced documents, Las Vegas Gaming, Inc. provides paragaming by utilizing a controller unit, coined as the PLAYERVISION™ Controller Unit (PCU) that interfaces to the electronic gaming machine. One aspect of the PCU is to provide and monitor the paragaming activity. One of the hurdles that are encountered when providing this capability is associated with collecting funds or providing monetary winnings associated with the paragaming activity. Upon visiting a modern day casino, the growing popularity of paragaming activity is clearly evident. Much of the push for the paragaming activity is to provide incentives for customers to stay and play. The obvious goal of a casino is to minimize the down time, or idle time for each electronic gaming machine. And as the troubadour Neil Diamond sang so poetically "money talks". Thus, although providing grandiose entertainment to the casino patrons can help to increase playtime, there is nothing like the added excitement of a potential cash windfall. However, to provide monetary winnings, as well as charging patrons for certain paragaming activity, it is necessary to interface to the casino accounting system, as well as meet any required regulations. Thus, there is a need in the art for a technique to providing paragaming activity that can charge funds and provide monetary winnings. Further, such a technique needs to cooperatively interface with the casino's accounting system.

As one could easily imagine, running a floor full of electronic gaming machines, most of which have moving parts and are subject to drink spillage and the occasional kick or punch from a not so fortunate patron, can be quite costly. As such, casino operators are much more receptive to new ideas, such as paragaming, as long as it adds to the bottom line rather than simply raising costs. Customizing EGMs to provide paragaming activity and to interface to the casino's accounting system can easily be cost prohibitive. Thus, there is a need in the art for a technique to provide paragaming on existing electronic gaming machine platforms in a manner that does not require the costly activity of customizing the system to interface to the casino's accounting system.

BRIEF SUMMARY OF THE INVENTION

The present invention advantageously provides the ability for paragaming activity to be parasitically provided on an electronic gaming machine. In one embodiment of the invention, a cashout event is detected by a controller unit. The controller unit may detect the cashout event by receiving a cashout command over a SAS port or by detecting printer commands commensurate with a cashout event over a printer port, or both. The controller unit effectively operates to prevent the cashout event from printing a cash voucher and instead, offers to the customer the opportunity to participate in a paragaming activity. If the customer declines, the cashout event is concluded and a voucher is printed. However, if the customer accepts the offer, the controller unit parses the printer commands to identify a validation number and causes a "voucher in" event to occur via a validation/redemption server (referred to herein as a VRED™ server). If the balance from the redeemed voucher is sufficient, then the controller unit deducts the fee associated with the paragaming event from the balance. In addition, certain paragaming events may also include payout tables and provide winnings. If the paragaming activity results in a winning event similar actions can be taken to add the winnings to the existing balance. Alternatively, other SAS or standard commands may be used to implement the payout aspect of the paragaming event. This allows the accounting system to keep a record of the event. A unique ID is associated with the transaction to facilitate tracking and reporting. The controller unit then prints a transaction receipt and a cash voucher.

Another aspect of the present invention is to move funds from the controller unit onto the EGM instead of printing out a cash voucher. This aspect of the invention is realized by placing the controller unit between the EGM and the bill acceptor and communicating to the bill acceptor through its interface—typically a serial port. Advantageously, this aspect of the present invention not only enables the transfer of funds from the controller unit to the EGM, but it also enables a variety of other features to the bill acceptor. For instance, the controller unit can temporarily turn the EGM into an ATM, allow the customer to extract funds through the ATM to be loaded into the controller unit, and then transfer these funds via ATM transfer using a card reader interface with the controller unit. The card reader is also connected to controller unit so that the controller unit can read cards and can do further actions for cards that the EGM would normally reject.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention, as well as features and aspects thereof, is directed towards providing paragaming activities on existing electronic gaming machine platforms in a manner that allows for the collection of finds to engage the paragaming activity and/or providing monetary winnings to customers through controlling the bill acceptor, printer and/or the card reader elements of the EGM. One aspect of the present invention is a novel way to interface to the casino's accounting system without requiring customization of the paragaming system or altering of the existing accounting system. It should be understood that the various casinos may use different accounting systems to operate the electronic gaming machines. To build a paragaming device that interacts with the accounting systems would require the cooperation of the slot accounting software vendor to develop a software interface for the paragaming device. In general, a PLAYERVISION™ Controller Unit (PCU) is associated with a gaming machine, preferably interposed between a master controller thereof and one or more peripherals thereof. Preferably, the PCU is connected to one of the SAS ports available on a typical electronic gaming machine (most machines include at least two), to interrogate and obtain certain information and/or to control certain aspects of the electronic gaming machine. The other SAS port of the electronic gaming machine interfaces to a SMIB to enable communication with the casino accounting system. Similarly, in this aspect of the present invention, the PCUs interface to at least one server, such as a validation/redemption (VRED™) server over a network, such as an Ethernet connection. The server then interfaces to one or more SMIBs using the SAS protocol and as such, provides an interface to the slot accounting system. Turning now to the figures, various aspects, features and embodiments of the present invention are described in more detail.

Figure 1:
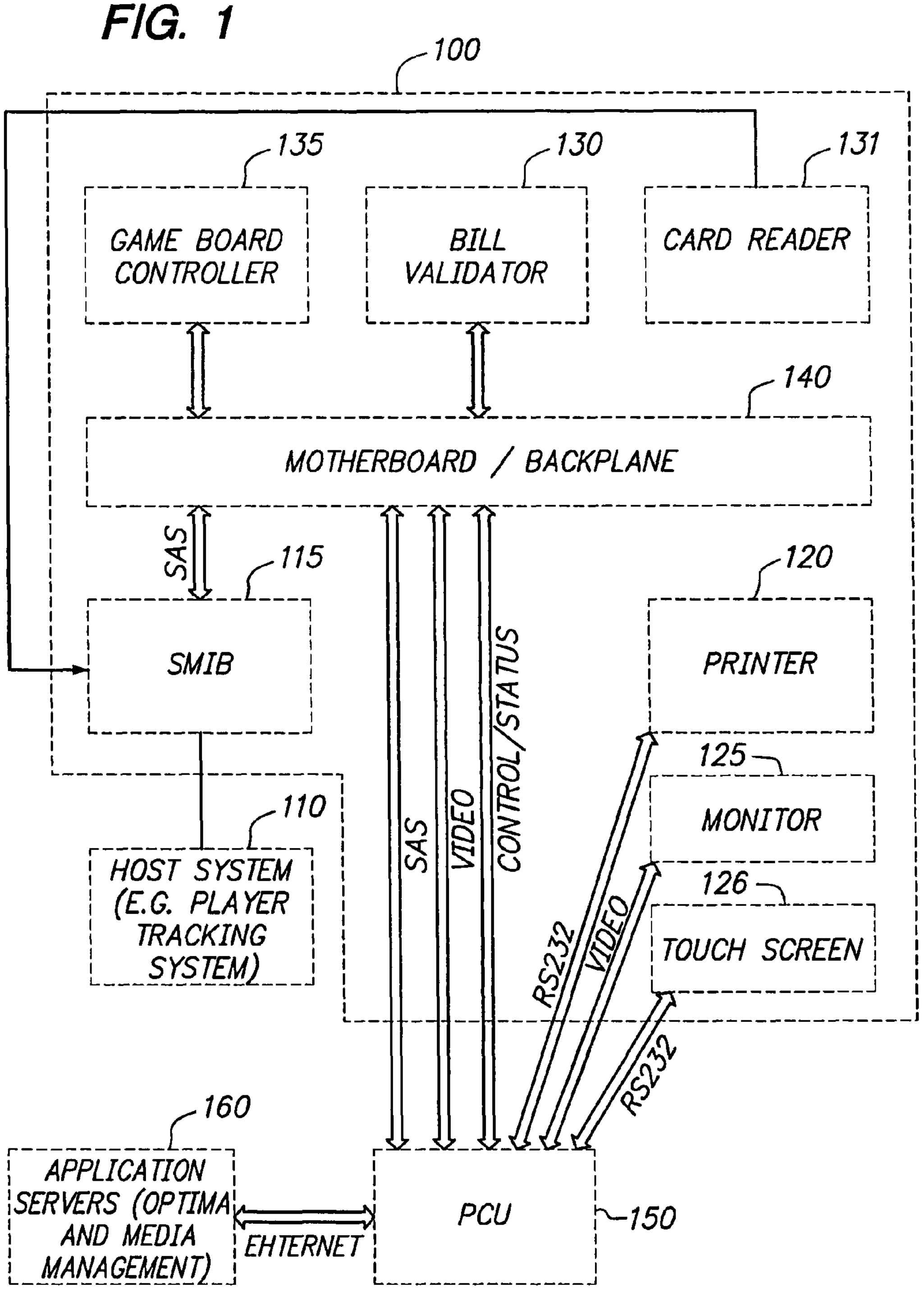
FIG. 1 is a block diagram illustrating a typical interface of a PCU to an existing gaming machine platform.

FIG. 1 is a block diagram illustrating a typical interface of a PCU to an existing gaming machine platform. Such an environment is suitable for various embodiments of the present invention although, it should be understood that the illustrated embodiment is only an example of a suitable environment and the present invention is not limited to operation within the illustrated environment. The environment includes an electronic gaming machine (EGM) 100 which is typically an approved and regulated machine. The EGM 100 is connected to a Host System 110 via a Slot Machine Interface Board (SMIB) 115, and includes a Printer 120, a Monitor or display 125 (such as an LCD, plasma, CRT, or other types of displays now known or later developed); a Bill Validator 130 and a Game Board or Master Gaming Controller 135, all interconnected through a motherboard or backplane 140. A PCU 150 interfaces to the EGM 100 and to an application server 160. The PCU 150 interfaces to the motherboard/backplane 140 using a SAS interface or protocol. The PCU 150 also interfaces to the printer 120, the Touchscreen 126, and the Monitor 125. The PCU 150 interfaces with the existing video and the Printer 120 of the EGM 100 (such as a slot machine), and adds an application suite of additional functionalities to the existing EGM 100. As detailed below, the PLAYERVISION™ controller unit and system is designed to enhance the functionality, entertainment value and revenue per machine beyond the machines current capabilities.

The PCU 150 in cooperation with the Application Servers 160 effectively converts existing slot machines into dual purpose slot machines/kiosks. One of the products that incorporate this invention, or aspects of this invention is referred to by the applicant as the PLAYERVISION™ system. The suite of applications, and the PCU 150 do not rely-on, or modify the EGM's 100 current functionality. Thus, the suite of applications is an extension and enhancement of the existing resources and video "real-estate" within the EGM 100.

For example, in one embodiment of the present invention, casino operators may be provided with the ability to:

1. Promote and sell a linked progressive Keno style game such as NEVADA NUMBERS® and THE MILLION DOLLAR TICKET® directly via an EGM 100 that is connected to an on-premise, application server 160 housing a game management system for the offered games. The EGM 100 functions as a ticket or keno writer station or kiosk in this particular application.

2. Display a customized marketing loop of video content when the EGM 100 is idle enabling the casino operator to more effectively promote and communicate to their customers on an EGM 100 that otherwise was not being fully utilized. Such a function can be turned on and/or off as defined by the casino operator (i.e., auto "on" after "X" minutes of game idle-time, and "off" with a screen-touch or after a specific number of minutes).

3. Present TV programming (audio and video) on the EGM 100 via the Monitor 125 (or portion thereof) with user selectable channels.

Other non-limiting examples of capabilities/features that could be providing in various embodiments of the present invention include:

1. Providing the ability to accept other wagers and transactions that otherwise would not have been possible through the EGM 100. An example of this additional wager is a race and sports wager. To implement such a feature or functionality, the EGM 100 acts as a kiosk terminal interfacing into existing, approved, gaming systems in operation at the casino.

2. Providing the ability to perform, configure and direct player specific marketing or paragaming activities to the player. In one embodiment, the PCU transmits player specific advertising or games, for example, as provided by one or more of the application servers. The application servers may configure the advertising or games for the player based upon identification information obtained remotely. In such an embodiment, for example, the application server(s) may communicate with one or more player tracking servers of the host gaming system so as to obtain player information.

3. Providing the purchase of a live Keno game and commerce/couponing capabilities.

The PCU 150 is connected to the video display or Monitor 125, the printer 120 and a SAS port of the motherboard/backplane 140 of the EGM 100, as well as the Application Servers 160 to provide the above-described functionality. In an exemplary embodiment, the Application Servers may include a Game Management system, a Media Management System, and/or a feed of media content, such as the game provider's local television network (i.e. CATV). In one embodiment, the television or other video presentation is delivered to the EGM 100 via a coaxial cable; however, it will be appreciated that other delivery mechanisms are also anticipated including various wired, optical, networked, and wireless delivery techniques, as well as streaming server to PCU and other techniques.

To further give an appreciation of the application of the present invention, three distinct capabilities, features or aspects of an environment in which various embodiments of the present invention can operate are described. By understanding these capabilities/features, the advantages associated with embodiments of the present invention can be more appreciated.

As a non-limiting example of the operation of the present invention, the provision of a paragame referred to by the applicant as SLOTTOVISION, is described as being provided through an embodiment of the present invention. In providing this paragame, the PCU 150 makes use of the input mechanism of the EGM 100, such as the touch screen 126 of the EGM 100 if applicable, to serve as the interface to merchandise the paragame to the customer. Activity on the user interface is presented to the Game Management System residing in the Application Server 160. The Game Management System then performs standard procedures associated with writing a keno or other ticket. For example, a ticket for NEVADA NUMBERS® or a THE MILLION DOLLAR TICKET® can be provided as though written by an approved writer station connected to a Game Management System. Additionally the PCU 150 makes use of the existing printer 120 attached to the EGM 100 to produce a valid ticket receipt that contains all information required by Minimum Internal Control Standards. Beyond the normal approved validation and logging process typically provided by a writing station for a NEVADA NUMBERS® and THE MILLION DOLLAR TICKET® transaction, the PCU 150 also connects to the game provider's existing Slot Accounting System with its own unique asset number to properly account for transactions.

As another non-limiting example, embodiments of the present invention may provide a paragaming function referred to by the applicants as ADVISION. An example of ADVISION is the provision of advertising or other content to an otherwise un-utilized display device (such as a television in a restaurant or a video gaming machine, etc.) In providing this feature, the PCU 150 interfaces to the Monitor 125 of the EGM 100 display to present advertisements, information, messaging, and promotions to viewers in either a player-selected, or "screensaver" mode. This presentation can be completely "client-specific", or in other words, can be controlled by the display device operator (i.e., casino operator). The content can be still-frames, animations, full-motion videos or a combination of two or more of these. This feature can permit complete control over the content as to display times, campaign start/stop dates, display schedules, and background media management functionality. Both player-selected and screensaver modes are interrupted by a screen-touch, game initiation (game buttons), or cash-in events to restore the EGM 100 to the appropriate state. For example, the PCU could used to provide the home page for an EGM. Players then would have a choice of going to paragames or base game versus blending of the two up front.

Yet another non-limiting example of the operation of the present invention is the provision of what the applicant refers to as PLAYERVISION™ TV on an EGM incorporating the present invention. When this paragaming feature is enabled (i.e. when selected by the player or otherwise enabled) this embodiment of the invention presents audio and/or video from a tuned TV station or from some other video source. The player or viewer is able to control the content being viewed by changing or selecting a channel, adjusting the volume and/or disabling the viewing. The display can be positioned and/or re-sized by the player so that it doesn't interfere with underlying game they are playing. With coax feed, the full range of "in-house", client site channels are available, or the operator may restrict the viewable content to selected "band" of channels.

More specifically, the PCU can be an advanced multimedia device and in a general embodiment, can interconnect with multiple video sources, such as a CATV network, through a variety of video inputs and formats, multiple data sources through a variety of data lines and multiple application servers typically attached to a LAN via an Ethernet connection or wireless encrypted 802.11x standards. The sources, media types and channel choices available can be based on the player's profile. For some anticipated embodiments, although not necessarily required for all embodiments, the PCU connects to the EGM through one or more functional connections including:

(a) the video monitor or display 125
(b) the printer, such as the ticket-in/ticket-out printer 120
(c) the SAS port of the motherboard/backplane 140
(d) the touch screen 126
(e) the bill acceptor 130 and
(f) the card reader 131

The application servers provide the management of the specific application being performed on the EGM through the PCU. The application server 160 illustrated in FIG. 1 may include a Game Management System and/or a Media Management System. It should be appreciated that other applications may also be included. Video content, such as TV programming can be delivered to the PCU through a coax connection or through other interfaces, such as through a LAN or wireless network. Although the present invention can incorporate a variety of embodiments and interface to a variety of application servers, some of the typically anticipated applications are further described as a non-limiting example of the operation of the present invention.

In general, games such as keno games, lotteries, race and sports and progressive games have a Game Management System that can be interfaced to through a writer station to order and pay for participation tickets. In embodiments of the present invention, the Game Management Server enables the PCU to connect to a Game Management system as if it were a standard writer station on the network. As such, the PCU enables slot machines to deliver self-service transactions for a variety of games, such as NEVADA NUMBERS®, THE MILLION DOLLAR TICKET® or other such games. In one embodiment, the PCU interface uses a custom socket-based protocol over a TCP/IP network to send, receive and acknowledge messages regarding NEVADA NUMBERS®, THE MILLION DOLLAR TICKET® or other game receipts. For security, all messages can be encrypted and authenticated using AES 256 or other common encryption or encoding methods. The PCU, through the Game Management System, connects to a central system at each location the Game Management System for the NEVADA NUMBERS®, THE MILLION DOLLAR TICKET® or other game of interest that serve the games and that are housed at a physically secure location, and operates to validate and manage all transactions. The system utilizes real-time authentication and authorization and precludes tickets from being issued if there is no connectivity.

The Media Management (also referred to as the Media Management and Entertainment Server Application) enables the PCU to provide media and marketing content to the electronic gaming machines. Utilizing this aspect of the present invention, the owner or operator of the electronic gaming machines can more effectively market and promote to their customers. The Media Management application enables operators to schedule unique loops of content, whereby the content can be programmed to play for a specific duration of time (e.g. 30 seconds), during a specific period of time (e.g., from start date to end date), or for specific times, days and weeks (e.g., M, T and Th from 1:00 pm to 5:00 pm. In one embodiment, the PCU interface uses a custom socket-based protocol over a TCP/IP network to send, receive and acknowledge media content and playlist instructions.

Figure 2:
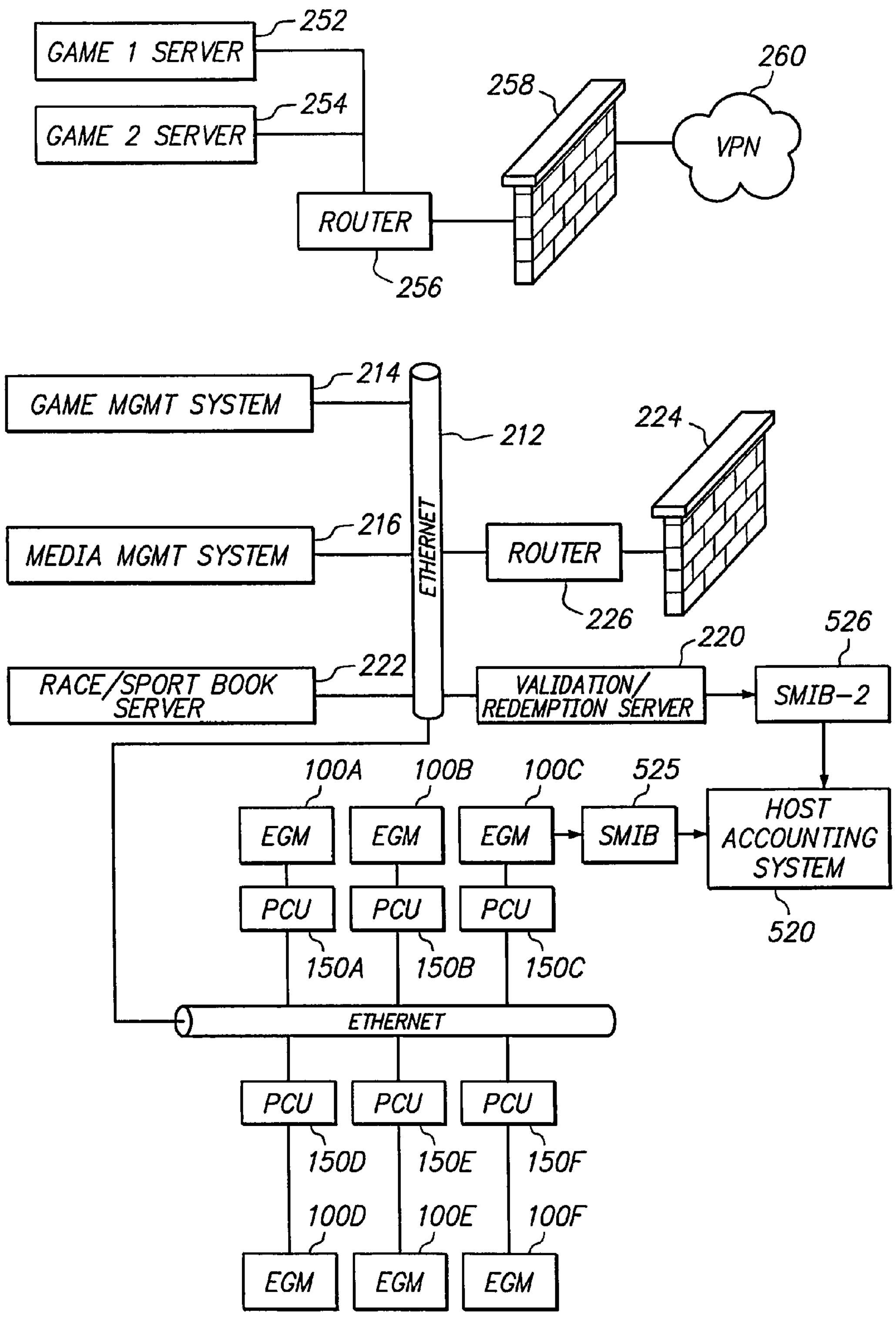
FIG. 2 is a system block diagram illustrating a typical environment that includes an embodiment of the present invention.

FIG. 2 is a system block diagram illustrating a typical environment that includes an embodiment of the present invention. The illustrated embodiment of the present invention comprises a network 212 including application servers such as a Game Management System 214, a Media Management System 216, a Validation/Redemption Server 220 and a Race/Sports Book Server 222. A bank of electronic gaming machines 100*a-f* is communicably coupled to the network 212, with one or more of the electronic gaming machines 100*a-f* being connected to a network through a PLAYERVISION™ Control Unit 150*a-f* respectively. Each electronic gaming machine and PLAYERVISION™ Control Unit pair typically resembles the configuration illustrated in FIG. 1.

The bank of electronic gaming machines is shown as being connected to the network through a CAT-5, CAT-6, a secure wireless connection or some other technique. The application servers are protected from external communication through a firewall 224 connected to a router 226. The Game Management System 214 connects to one or more game servers (two game servers 252 and 254 are illustrated in this exemplary embodiment) through a VPN 260 or other private network. In general, within a casino environment, servers are protected by industry-standard hardware or host-based firewalls to prevent unauthorized network traffic from affecting system components. In addition, in the illustrated embodiment, a firewall 258 is also placed between the frame relay and or VPN/dial-up connection that connects to the game servers. Communication with the game servers is routed through router 256 and can be conducted by HTTP/SSL over a VPN connection. Data may be encrypted and authenticated using industry-standard SSL communications over a VPN connection.

Figure 3:
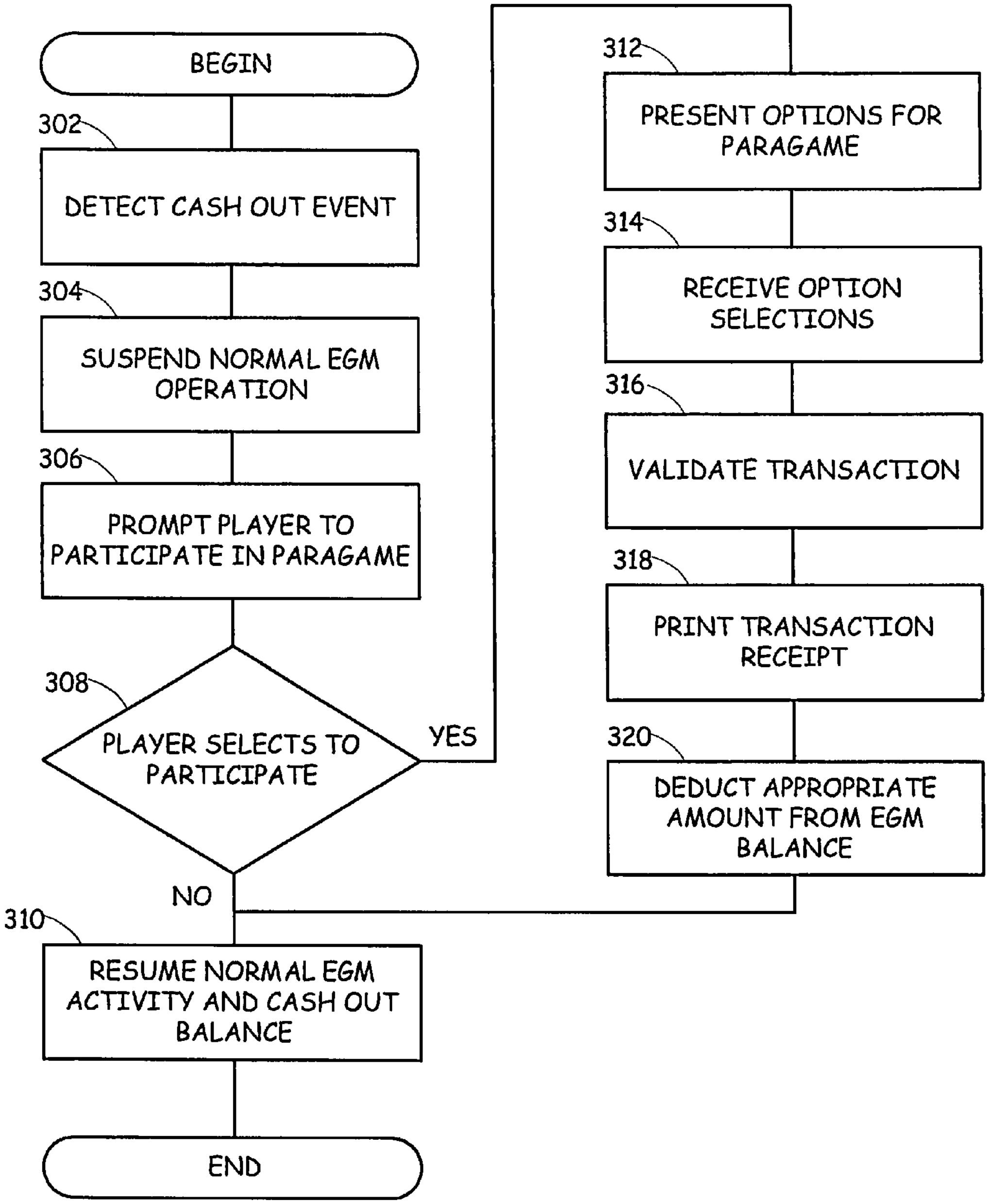
FIG. 3 is a flow diagram illustrating the steps involved in an exemplary embodiment of the present invention wherein a paragame is provided via a standard electronic gaming machine.

FIG. 3 is a flow diagram illustrating the steps involved in an exemplary embodiment of the present invention wherein a paragame is provided via a standard electronic gaming machine. In general, a PCU associated with an EGM detects the occurrence of a triggering event, such as a cashout event, and then proceeds to offer participation in a paragaming event to the customer. More specifically, in the illustrated embodiment, the PCU detects the occurrence of a cashout event 302. It should be noted that other events could be used to trigger the offer of paragaming participation and the cashout event is simply one, non-limiting example of an event. Other non-limiting examples may include adding additional money to the EGM, a threshold increase in the EGM balance due to one or more wins, a threshold period of time for playing, a threshold period of idle time, a random time-out, a periodic time-out, a player selecting an icon on the monitor, etc. Once a trigger event is detected, normal operation of the EGM is suspended 304. In the illustrated embodiment, the cashout process would be interrupted. The player or customer is then prompted or provided an offer to participate in a paragaming event 306. The offer and/or the available paragame(s) can be selected based on the user profile upon cash out. If the customer declines to participate in the paragaming event 308, the normal EGM activity is resumed. In the illustrated example, the normal operation would then proceed with a cashout of the current balance in the EGM by printing a cash voucher or other cashout vehicle 310.

However, if the player elects to participate in the paragaming event 308, the customer is presented with options pertaining to the paragaming event 312. This step can vary greatly depending on the particular embodiment of the invention. For instance, if the paragaming activity is a wide area progressive keno game, the customer may select the number of desired tickets and select the particular numbers for each ticket or have the Game Management System 214 select a quick pick option through the appropriate game server. In an advertising or couponing paragaming scenario, the customer may be presented with the option to purchase a meal voucher, purchase a product, etc. If the paragaming event is the provision of media content, the customer may be presented with the option to view the media for a select period of time or otherwise. In any event, the selected options are received 314 and the option selection process either ends automatically upon the last selection or proactively by the customer selecting a purchase button. At this point, the transaction is validated 316 and transaction receipt is printed 318. The cash balance in the EGM is reduced by the purchase or participation price 320. Normal operation of the EGM then resumes and, in the illustrated example, a cashout of the current balance in the EGM is performed by printing a cash voucher or other cashout vehicle 310.

In a more specific example, this embodiment of the invention may be utilized to provide a slot machine customer with the opportunity to participate in a paragame, such as NEVADA NUMBERS® upon the occurrence of a cashout event. When the cashout process is initiated, instead of the slot machine immediately producing a cash voucher, the PLAYERVISION™ platform temporarily suspends the slot machine, and prompts the player if they would like to purchase a chance at the upcoming NEVADA NUMBERS® drawing. If the player is not interested in making such a wager, then the normal cashout process takes place where a cash voucher for the funds is validated through the slot accounting system. If the player is interested in purchasing a NEVADA NUMBERS® ticket, then the customer is presented with the option to select their own numbers or have the Game Management System generate a quick pick ticket. Once the numbers are selected or the quick pick option is selected, the customer can proceed with the transaction by pressing the "Proceed With Purchase" button. Once the system receives the customer's acknowledgement the transaction is validated via LVGI's OPTIMA™ Game Management System a receipt is printed from the standard printer attached to the slot machine. The PLAYERVISION™ system then deducts the appropriate amount from the slot machine's account balance to cover the cost of the NEVADA NUMBERS® transaction. Lastly, the customer receives a cash voucher for the remaining balance.

Figure 4:
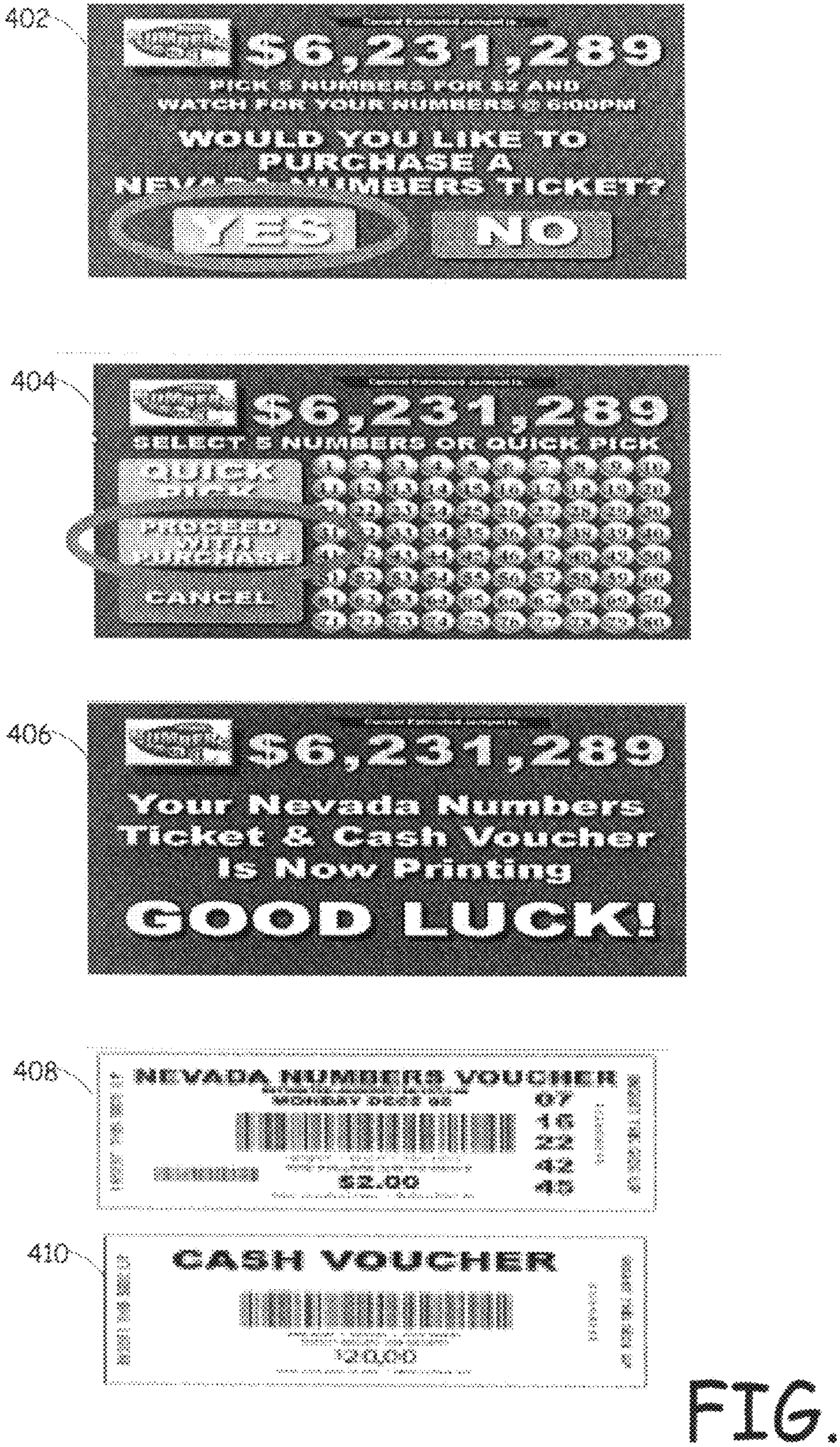
FIG. 4 is a screen/presentation flow of a specific embodiment of the invention as generally described in conjunction with FIG. 3.

FIG. 4 is a screen/presentation flow of a specific embodiment of the invention as generally described in conjunction with FIG. 3. Screen 402 is presented to the customer upon the detection or occurrence of the triggering event 302 (i.e., a request to cashout). Screen 402 provides current jackpot status information for the NEVADA NUMBERS® Keno game, presents the rules and cost to participate and then invites the customer to play 306. Screen 404 presents a user interface to entering options pertaining to the paragaming event 312. In this example, the options allow the customer to select five numbers from the available 80 numbers or to request a quick pick. Once the customer is completed 314, the customer can select the "proceed with purchase" button to continue or may cancel out of the transaction. If the customer selects to proceed with the purchase, screen 406 is presented to notify the customer that the transaction has been validated 316 and that the receipt/ticket 408 is being printed 318. Finally, the cash voucher 410, with a balance reduced by any fees associated with the purchase of the NEVADA NUMBERS® ticket 408, is also printed out for the customer as the normal operation of the EGM resumes 310.

One aspect of the present invention is to non-invasively provide the paragaming functionality in a parasitic manner by detecting the occurrence of a cashout event, temporarily taking over operation of the user interface of the EGM, providing the paragaming event to the customer and then conducting all accounting functions necessary to extract payment for the paragaming event participation. Each PCU connects to the Game Management System with a unique station ID. All transactions that occur, via the PLAYERVISION™ implementation, are tracked via the Game Management system in an identical manner in which regular Keno and NEVADA NUMBERS® tickets are written via a writer station. Additionally, each PCU connects to the casino's slot accounting system and is recognized/enrolled as a unique asset number in order to properly record validation and redemption requests made by the PCU.

Figure 5:
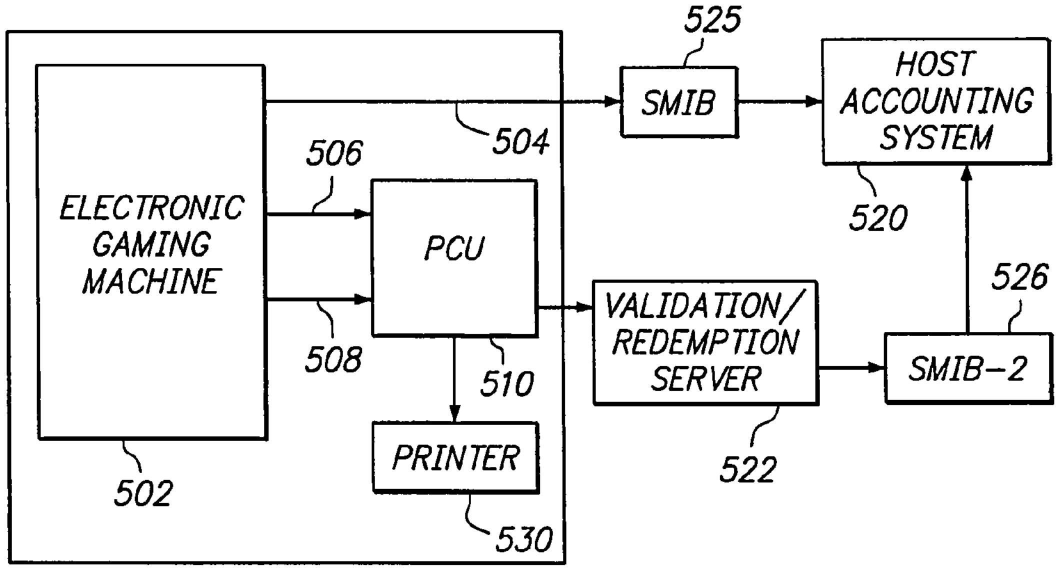
FIG. 5 is a block diagram showing the components involved in implementing an embodiment of the present invention to detect a cashout event for a typical gaming machine.

The process will be described in more detail with reference to FIG. 5. The process is initiated by the EGM 502 upon notifying the host slot accounting system 520 via the SMIB 525 that a cashout ticket is being requested. The PCU 510 operates to detect this event in one or both of two ways. First of all, the EGM 502 may send a cashout ticket printing command on the primary SAS 504 and secondary SAS 506 ports. This command can be detected by the PCU 510. Secondly, the EGM 502 will initiate printer activity by sending printer commands over the printer port 508. The PCU 510 can detect and intercept these commands as it sits between the EGM 502 and the printer 530. Upon detection of the printer activity and or the cashout command, the provision of the paragaming activity is initiated.

In operation, the PCU 510 captures the printer message on the printer port 508 before the ticket begins to print. If the customer elects to pass on participation in the paragame, the PCU 510 then passes the printer message on to the printer 530. However, if the customer elects to participate in the paragame (i.e., to make a purchase) the data intended to be printed onto the ticket is then parsed to identify an asset number, a validation number, a date and a time. This information is then sent via the Ethernet connection to the Validation Redemption Server (VRED™) 522. If the captured ticket is not a cashout ticket, or if the VRED™ server 522 is not connected or otherwise not able to process redemptions, the PCU 510 continues to pass the ticket printing information directly to the printer for a normal cashout process.

Using the information extracted from the ticket printing commands, the VRED™ server 522 acts as a virtual Electronic Gaming Machine (EGM) and redeems the full value of the ticket from the Host Accounting System 520 through a second SMIB board 526 connected between the VRED™ server 522 and the Host Accounting System 520. The VRED™ server 522 is considered another EGM to the Host Accounting System 520. The second SMIB 526 associated with the VRED™ server 522 is enrolled to the Host Accounting System 520 with an asset number like any other EGM. As such, the VRED™ server 522 is tracked monetarily like any other EGM.

It should be appreciated that the system configuration described herein may also be employed to provide a variety of other capabilities. In fact, applications can be provided to the EGM by assigning a unique transaction ID for the application and then using one unique SMIB for each unique transaction ID. For instance, a transaction ID could be assigned for Races, and one for Sports and then an SMIB would be used to provide access for these applications into the system. Further, this can be broken down more granularly by assigning a unique ID and using a dedicated SMIB for individual sports (i.e., football, baseball, boxing, etc).

It should be appreciated that in an exemplary embodiment, the PCU does not present the paragaming interface until the VRED™ server has successfully redeemed the original cashout ticket or an equivalent event has been completed. For instance, the PCU could obtain the necessary information from the SAS, or some other network accounting protocol, to poll the EGM to identify or verify the money that presently exists on the meter. Thus, the PCU needs to know how much money is available for wagering on the paragame. After the PCU receives the placement of a wager, the PCU then instructs the VRED™ server regarding the remaining balance. After the VRED™ server has redeemed the full value of the ticket issued by the EGM, the VRED™ server subtracts the amount required to make a purchase and validates a ticket with the Host Accounting System for the remaining amount of money. The VRED™ server then performs the cashout function by sending modified printer commands to the PCU for delivery to the printer and for printing a cashout ticket.

Figure 6:
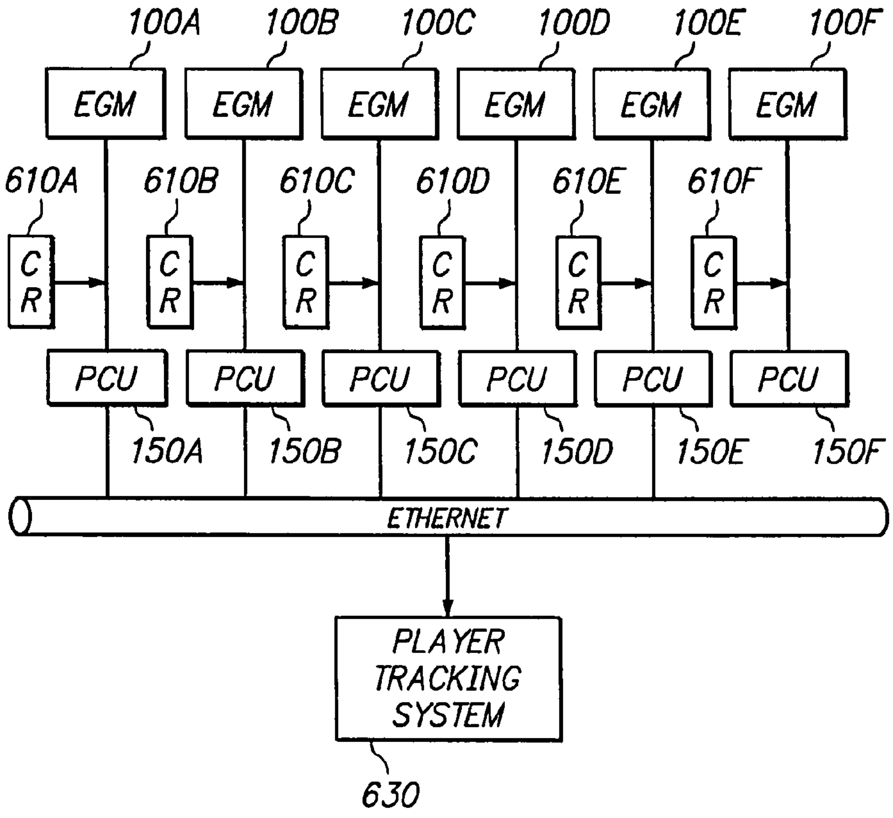
FIG. 6 is a block diagram illustrating an exemplary embodiment of the invention for providing enhanced capabilities through card reader access.

FIG. 6 is a block diagram illustrating an exemplary embodiment of the invention for providing enhanced capabilities through card reader access. This aspect of the present invention allows the PCU to provide additional functions not normally available to the EGM. For instance, the PCU may be configured to communicate with a card reader 610*a-f*. In such event, if a card is entered into the card reader 610*a-f*, the EGM 100*a-f* would examine the card to determine if it is valid. If the card is not valid, the PCU 150*a-f* may then examine the card to determine if a special feature is to be provided. An example of one such feature would be for the PCU 150*a-f* to detect that the card is a credit card and then invoke the proper clearing house systems to extract funds on behalf of the player. Similarly, the card may be identified as an ATM card and the PCU 150*a-f* could then operate as an ATM machine. In essence, embodiments of the present invention could be configured to provide any service desired related to the reading of a card in the card reader 610*a-f*. This aspect of the present invention enables the PCU to ID players and then associate game play etc. with that player to be able to direct CASHOUT propositions, advertisements, games, screen format, etc. In one embodiment, as indicated above, the PCU might also be configured to communicate with a player tracking system or server 630 of the host gaming system. For example, the following steps may be included in such a process:

Player inserts card

PCU sends inquiry for player data to player tracking server 630

Player tracking server 630 responds with current player data

Session play tracked locally

Player record updated with session data upon card removal

Figure 7:
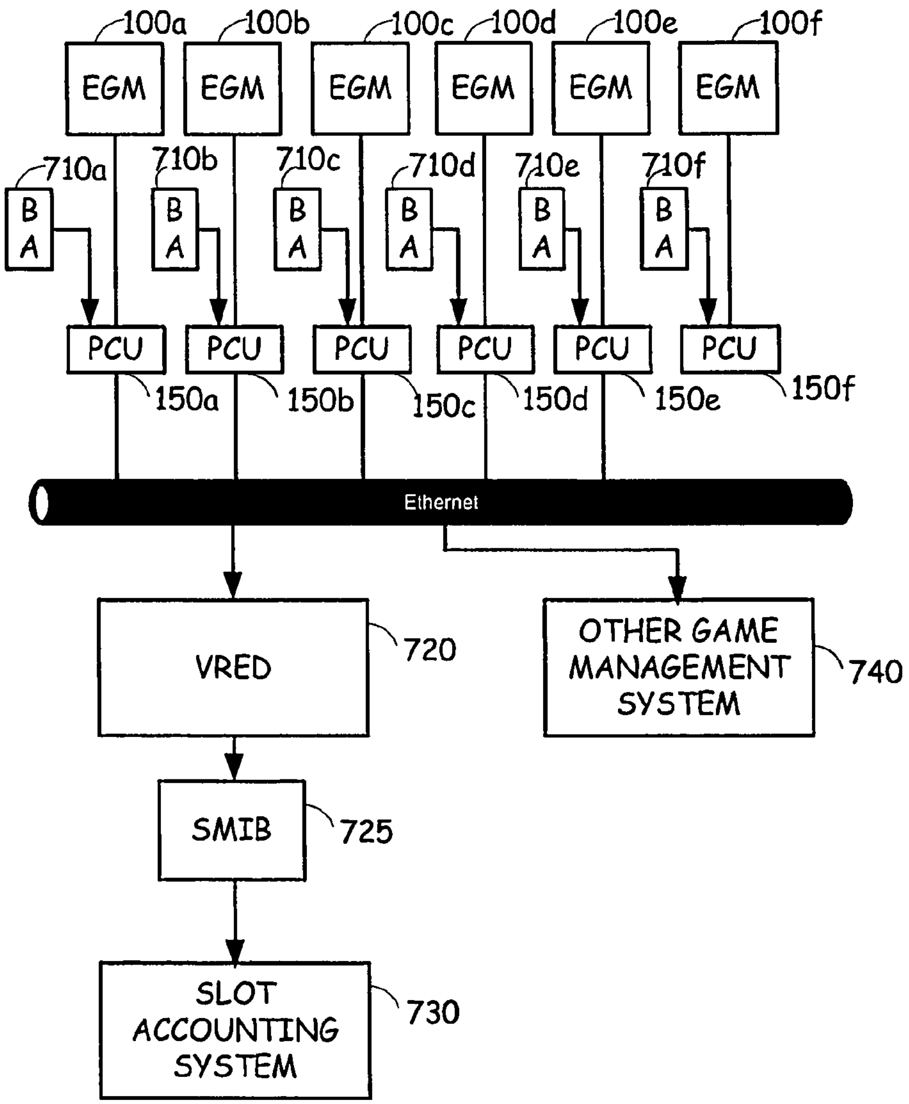
FIG. 7 is a block diagram illustrating an exemplary embodiment of the invention for providing enhanced funds transfer capabilities through controlling the bill acceptor.

It should also be noted that if the paragaming event includes payout capabilities, that the balance in the Host Accounting System may also be increased by any winnings earned in the paragaming event. FIG. 7 is a block diagram illustrating an exemplary system that would enable the transfer of funds obtained or won through a paragaming application to the customer via various means. The connection between the EGM 100 and the bill acceptor 710 is broken and the PCU 150 interfaces to the billing acceptor 710 instead. In operation, if a paragame results in a monetary win for the customer, the PCU 150 can execute commands common to the bill acceptor 710 to institute a cash-in or ticket-in event and thus, increase the credit in the machine. Thus, this aspect of the present invention enables the PCU to move funds on to the EGM by "virtually" inserting a cash voucher into the Bill Acceptor (BA) path. In addition, it enables the PCU to read and validate vouchers from other game management systems (e.g. OPTIMA™, Race and Sports, etc.) and move funds onto the EGM.

As a non-limiting example, the application of one or more of the above-described embodiments of the present invention is described using a particular configuration. In this configuration, a slot machine is used to parasitically provide a customer with a NEVADA NUMBERS® interface. As such, the following process takes place during a typical NEVADA NUMBERS® transaction via a PLAYERVISION™ system embodying aspects of the present invention. Once a cash-out is initiated, the game unit will log the value of the funds in the gaming machines voucher-out meter as it normally would do (e.g. $20). The PCU then steps the customer through the selling proposition for NEVADA NUMBERS® as described above. If the customer proceeds with the purchase of a NEVADA NUMBERS® ticket (via the PLAYERVISION™ system), then the PCU will redeem the value of this cashout onto the PCU and it is properly recorded on the casinos slot accounting software with a unique associated asset number and the ID number of the utilized EGM. The PCU will then validate with the Game Management System the transactions and return to the PCU the appropriate information in order to print a valid ticket. The PCU then deducts the cost of the NEVADA NUMBERS® transaction (e.g. $2) and then validates the balance with the casino's slot accounting system using the asset ID from the SMIB connected to the VRED™ server in order to properly print a cash-voucher equal to the remaining balance (e.g. $18). For further auditing and reporting purposes, reports are provided, in addition to standard transaction reporting, so a transaction can be identified and traced to a specific EGM and time. It should be noted that in a typical embodiment, the PCU will not allow the selling process to take place if the gaming machine returns a value upon a cash-out event that is less than the minimum transaction amount. Additionally the PCU will limit the number of NEVADA NUMBERS® tickets to be purchased such that it does not exceed the amount returned from the gaming machine upon a cash-out event and/or the maximum number of multi-race tickets allowed. However, in other embodiments, it will be appreciated that the customer's credit card can be used to pay the remaining balance of any request tickets or, the customer could be prompted to enter additional money into the machine.

Thus, advantageously, the present invention allows the provision of paragaming activity by connecting to a single SMIB, or multiple SMIBs in some embodiments for each desired level of control and accounting, in the back office to interact with the Host Accounting System without the need for cooperation from the slot accounting software vendor to develop a software interface to the Host Accounting System software. The Host Accounting System interprets the PCU as just another electronic gaming machine on the network. On most electronic gaming machines there are at least two SAS ports. The PCU in various embodiments of the present invention connects to one of the SAS ports to interrogate and obtain certain information and control certain aspects of gaming machine as described above. The other SAS port connects to the SMIB in the slot machine. These connections are typically IEEE 485 or RS-232. All of the PCUs connect to VRED™ server via an Ethernet or other communication connection. The VRED™ server connects to one or more SMIBs, typically located in the back office.

The VRED™ server looks like another electronic gaming machine (EGM) to the Host Accounting System. The VRED™ server reports metered coin in, metered voucher dropped, and total drop to the Host Accounting System. The PLAYERVISION™ system does not need to accept money directly from a bill acceptor; however, in some embodiments the system may be enabled to accept such payments. All money transferred can come from vouchers captured from the EGM printer, therefore the EGM soft count is not affected. In a voucher based embodiment, at the time of cash out, the customer receives a voucher. This voucher can then go to cashier or back into machine. At the end of day, the casino knows the number of vouchers given out, so all money-in matches data received. When a paragame is offered and participation funds are extracted from the EGM, this would result in a disparity in accounting at the end of the day. Thus, embodiments of the present invention may employ the use of a printer in server room that is tied to the VRED™ server. When a customer pays for a paragame, the VRED™ server causes a voucher for the cost of the paragame to be printed out on behalf of player. As a specific example, suppose a player puts $10 into a machine and plays for a few minutes. The player loses $2 in the machine and then requests a cash out. Normally, this would result in printing out of an $8 voucher. However, in the present invention, this cash out request is captured and the system offers a $2 entry fee for a paragame. If this offer is accepted, the system prints out a $8 voucher in server room. In the Host Accounting System, the VRED™ server will show up as an EGM reporting coin in, voucher in, and voucher out. The VRED™ server will only show profit, since it is accepting money for another entity, such as the Race and Sport Book or Keno Lounge.

In a preferred embodiment, the VRED™ server not only appears like another electronic gaming machine to the Host Accounting System, but appears as a multi-game EGM. In particular, the VRED™ server is configured to track different paragaming activities using different game play meters in the same manner as a multi-game EGM. The Host Accounting System may poll the VRED™ server for individual paragame statistics or information. This allows the Host Accounting System to track marketing and auditing information related to the various paragame activities in the same manner that it would track individual games implemented by the actual EGM of the gaming machine.

In one embodiment, the VRED™ server connects to multiple SMIBs. If multiple PCUs request redemptions at substantially the same time, the VRED™ server may not be able to process those requests through a single SMIB within a required time (such as a maximum time to prevent a communication time-out or a maximum time allowed to redeem a ticket to prevent long delays to the customer). The number of SMIBs may be selected to ensure that the VRED™ server can sequentially process maximum simultaneous requests in a timely manner.

The invention may be configured to process transactions involving only a single paragaming activity or event, or multiple activities or events. For example, the invention may be configured in a manner that a player may be permitted to purchase a single keno ticket. That purchase transaction may be processed as a single event. In other configurations, the player may be permitted to select a number of items, such as purchasing a number of keno tickets, placing one or more sports wagers, or combinations thereof in "shopping cart" fashion.

In one embodiment, a player might be permitted to build a "wish list" of items, such as a variety of types of wagers or purchases. This wish list might be compared to the player's cash-out balance to determine if the wish list can be fulfilled. Wish list items might include gift certificates for a restaurant, hotel or spa. All of the player's selections may be processed either one at a time, or in group fashion. The wish list could also be stored, such as for use by a third party (such as a relative or friend) to make purchases for that player (such as by purchasing them a designated gift certificate).

As one paragaming activity, a player may be offered "bundles" of items. For example, as indicated above, various paragaming features may be offered via different systems or servers (such as keno tickets via a Game Management System and race/sports wagers via a Race and Sports Book Server). In one embodiment, a central server (not shown) or the VRED™ server (as configured with a particular application) may be configured to combine items or offers facilitated by those servers. For example, the player might then be offered the opportunity to purchase a $2 keno ticket via the Game Management System or place a $5 sports wager via the Race and Sports Book Server, or place a $6 wager to obtain both a $2 keno ticket and a $5 sports wager. This allows the opportunity for the operator to driver business towards underperforming assets.

Thus, embodiments of the present invention allow funds to be moved off and onto the electronic gaming machine without having to deal with different versions of the slot accounting software. In addition, because a system employing the present invention is viewed by the slot accounting system as a unique slot machine with a unique asset id, the accounting department is able to determine what the transactions were by the PCU sending up to the slot accounting system unique asset numbers for each unique transaction. As such, when a report is generated, all the results for a particular asset number can be compiled. Thus, different asset numbers can also be used to identify transactions for different paragaming activity (i.e., sports bets, keno tickets, lottery tickets, etc.).

Thus, embodiments of the present invention provide paragaming activity on an electronic gaming machine by detecting a triggering event on the electronic gaming machine. In one embodiment the triggering event may be a cashout event, however, other events are also anticipated by the present invention. In response to the triggering event, a paragaming event is presented on the screen of the electronic gaming machine and the customer is invited to participate. If the customer elects to participate, the funding of the paragaming event is subtracted from the available funds in the electronic gaming machine. The payment for the paragaming event is then reconciled with the accounting system for the electronic gaming machine. This can simply be accomplished by performing a voucher in command followed by a cashout command. As such, the activity is recorded in the accounting system for report purposes.

In one embodiment, a session identifier or "session ID" may be utilized to identify a particular set of transactions (whether involving only a single item or multiple items) within the system. For example, a session ID may be assigned to a particular player transaction in which the player wishes to purchase both a keno ticket and place a sports wager. This session ID may be stored at the VRED™ server. Detailed transaction information may be stored in association with the session ID. In this manner, transactions may be "audited", allowing all sessions with particular PCUs to be identified, and allowing all transactions associated with particular sessions to be identified.

As one feature of the invention, paragame transaction information might be displayable at the EGM as a result of such transaction tracking. For example, the PCU might be provided with a call function (such as accessible via a menu or an activation button on the PCU). Such a call function may transmit a request for transaction information to the VRED™ server. This call function may include the asset number for the PCU. The VRED™ server may then generate transaction information associated with that PCU and transmit the transaction information back to the PCU. The PCU may then be configured to display or otherwise output that information, such as via the display of the gaming machine. For example, in the event a player disputed a particular paragame transaction, an attendant might call the most recent transactions from the VRED™ server for display at the gaming machine via the PCU. This information could then be reviewed.

In one embodiment, by tracking particular transactions, a player might be presented with a list of most popular paragaming activities (such as most popular race/sports book wagers, etc.), or the most popular paragaming activities within a subset of the total paragaming activities (such as the top ten paragaming activities in total or the top ten race and sports wagers). Such information may even be customized to the player. For example, if a particular player regularly places sports bets upon Chicago Bears football games, that player may be presented with a particular sports book wager paragaming activity which comprises a Chicago Bears football game wager.

In one embodiment, as indicated, a VRED™ server may communicate with multiple SMIBs. In that instance, each SMIB may have separate meters for tracking each type of event which it processes. For example, if the SMIBs are configured to process both keno transactions and race/sports wagers, each SMIB may have separate meters for each of those types of events. In another embodiment, however, particular SMIBs may be configured to process particular transactions, and thus have only a meter or meters for those particular transactions. For example, one SMIB might be dedicated to processing keno ticket transactions, and another SMIB might be dedicated to processing race/sports book wagers. Of course, in the event a player engages in a transaction involving different types of events (such as purchase of a keno ticket and placing a race/sports wager in a single event), the PCU or VRED™ server might be required to split the transaction so that the appropriate SMIB processes the particular portions of the transaction.

The system could also be configured so that there are multiple VRED™ servers. In one embodiment, multiple VRED™ servers could be configured to process particular transactions, in the same manner as described above relative to the SMIBs. In another embodiment, multiple VRED™ servers might be provided for redundancy purposes. For example, PCUs might be assigned to a primary VRED™ server. If that VRED™ server is inoperable, the PCUs may be configured to transmit to a secondary VRED. In one embodiment, there might be only two VRED™ servers (a primary and a secondary). In other embodiments, there might be multiple VRED™ servers. Certain PCUs might be assigned to a first VRED™ server as a primary VRED™ server. That same VRED™ server might serve as the secondary VRED™ server for other PCUs.

As indicated, the PCU may be configured to work in systems utilizing communication protocols other than SAS. Such communication protocols may be other gaming communication protocols adopted by the Gaming Standards Association (GSA), or other protocols now known or later developed.

In one embodiment, the system and method may be configured so that the results of paragame activities or events may be reported at the EGM. For example, the system and method may be configured so that the PCU may report a winning keno ticket via the display of the EGM. Such an event may also include associating winnings for the event to credits at the gaming machine. In this regard, in one embodiment, winning tickets or other winning events may be presented at the gaming machine. In other embodiments, such winning tickets or events might be presented at other locations. For example, a winning keno ticket might be redeemed at a cashier station or remote kiosk.

In one embodiment, the system and method of the invention may be configured to permit a player to not only utilize funds associated with a machine/EGM at a cashout event to participate in a paragame event, but may permit a player to add funds. For example, a player may have only $20 in credits associated with the gaming machine at cash out. The player might wish to participate in $30 worth of paragame activity. In such event, the player may be permitted to associate additional funds ($10) with the gaming machine in order to fund the paragame activity.

As indicated herein, the paragaming activity which may be facilitated by the system and method of the invention may vary. Such may include purchase of keno or other gaming tickets, participation in other wagering events, such as race/sports events, and even purchase or participation in non-gaming events. For example, a player might be able to purchase show or concert tickets, purchase food or beverage or the like.

Other embodiments of the invention are contemplated. In one embodiment, the EGM 100 need not include a printer. For example, information which is normally printed on a ticket might be associated with other media, such as a magnetic stripe of a player card or be associated with a smart card or the like. In such event, the EGM 100 might include a card writer/reader or the like. In other embodiments, a printer could be located remotely from the EGM, such as associated with a bank of EGMs.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method for providing paragaming activity at a electronic gaming machine having an existing gaming machine controller which communicates with at least one video display via at least one communication path, wherein said gaming machine controller is configured to present information regarding one or more games to a player of said gaming machine via at least one video display of said gaming machine, the method comprising the steps of:

utilizing a secondary controller located at said gaming machine which operates independently of said gaming machine controller, which is configured to detect outputs of said existing gaming machine controller associated with play of said gaming machine by said player without modification of said existing gaming machine controller, and which is communicatively coupled via a communication link to said at least one communication path between said gaming machine controller and said at least one video display;

evaluating said outputs at said secondary controller for one or more pre-defined triggering events occurring at said gaming machine;

in response to the detection of a triggering event, presenting a paragaming event to said player via said at least one video display of the electronic gaming machine by transmitting paragame information from said secondary controller over said communication path to said at least one video display via said communication link, wherein the paragaming event is one or more of the paragaming events selected from the group of paragaming events including: a game, a payout table based on an underlying game of the electronic gaming machine and entertainment and whereby said paragaming event is presented via said secondary controller and not said gaming machine controller; and funding the paragaming event from the available funds in the electronic gaming machine upon detecting that said player has elected to participate in the paragaming event.

2. The method of claim 1, wherein said one or more pre-defined triggering events comprises a cashout event and the step of utilizing said secondary controller to detect said one or more pre-defined triggering events comprises the step of detecting a slot accounting system command for a cashout and detecting printer commands associated with a cashout process.

3. The method of claim 1, wherein said one or more pre-defined triggering events comprises a cashout event and the step of utilizing said secondary controller to detect said one or more pre-defined triggering events comprises the step of detecting a slot accounting system command for a cashout.

4. The method of claim 1, wherein said one or more pre-defined triggering events comprises a cashout event and the step of utilizing said secondary controller to detect said one or more pre-defined triggering events comprises the step of detecting printer commands associated with a cashout process.

5. The method of claim 4, further comprising the step of parsing the printer commands to obtain information about the cashout transaction.

6. The method of claim 4, further comprising the step of parsing the printer commands to obtain an asset number, a validation number, a date and a time.

7. The method of claim 1, wherein the step of funding the paragaming event further comprises the step of deducting the cost of the paragaming event from the current electronic gaming machine balance.

8. The method of claim 7, further comprising the step of reconciling the payment of the paragaming event with an external accounting system for the gaming machine, wherein the step of reconciling the payment of the paragaming event further comprises the step of sending a voucher in command to the slot accounting system with the new balance, and then sending a slot accounting system cashout command to the accounting system.

9. The method of claim 1, further comprising the step of reconciling the payment of the paragaming event with an external accounting system for the gaming machine, wherein the step of reconciling the payment of the paragaming event further comprises the step of sending a slot accounting system cashout command to the accounting system.

10. The method of claim 1, wherein said step of presenting a paragaming event comprises presenting a list of paragaming activities, said paragaming activities comprising at least one wagering and non wagering activity, and permitting said player to select none, as few as one, or a plurality of said paragaming activities in combination.

11. An apparatus for providing paragaming activity on an electronic gaming machine having an existing gaming machine controller which is configured to generate outputs related to one or more game play events and output game information for display via at least one electronic video display, comprising:

a secondary control unit having a first input communicatively coupled to an SAS output of the electronic gaming machine whereby said secondary control unit detects said outputs of said existing gaming machine controller via said SAS output, a second input communicatively coupled to a printer output of the electronic gaming machine, and at least one output communicatively coupled to the electronic gaming machine printer, said at least one electronic video display and a network interface;

a validation system communicatively coupled to the secondary control unit over the network interface and communicatively coupled to a host accounting system for the electronic gaming machine over an SAS connection to a slot machine interface board;

the secondary control unit being operable to detect the occurrence of a cashout event at said gaming machine via evaluation of said outputs of said existing gaming machine controller and in response, causing said at least one electronic video display to present paragame information which is different than said game information which is output by said gaming machine controller, said paragame information selected from a group of paragaming events including a wagering game, entertainment and a new payout table for the underlying game, receive an election to participate in the paragaming event, providing the paragaming event without interfering with the underlying gaming event and notifying the validation system of such election;

the validation system being operable to redeem the funds associated with the electronic gaming machine from the host accounting system, deduct a fee associated with the paragaming event and notifying the control unit; and the secondary control unit being operable to perform a cashout event with the new funds balance.

12. The apparatus of claim 11, wherein the secondary control unit is operable to detect the occurrence of a cashout event by detecting a cashout command on the SAS output of the electronic gaming machine and detecting printer commands associated with a cashout event on the printer output of the electronic gaming machine.

13. The apparatus of claim 11, wherein the secondary control unit is operable to detect the occurrence of a cashout event by detecting a cashout command on the SAS output of the electronic gaming machine.

14. The apparatus of claim 11, wherein the secondary control unit is operable to detect the occurrence of a cashout event by detecting printer commands associated with a cashout event on the printer output of the electronic gaming machine.

15. The apparatus of claim 14, wherein the validation system being operable to redeem the funds associated with the electronic gaming machine from the host accounting system and deduct a fee associated with the paragaming event by reducing an account balance by the fee amount, sending a voucher in command with the new balance to the host accounting system and sending a cashout command to the host accounting system.

16. The apparatus of claim 14, wherein the secondary control unit is further operative to parse the printer commands to identify a current balance for the electronic gaming machine.

17. The apparatus of claim 16, wherein the validation system is operable to redeem the funds associated with the electronic gaming machine from the host accounting system and deduct a fee associated with the paragaming event by reducing the account balance detected by the control unit by the fee amount, sending a voucher in command with the new balance to the host accounting system and sending a cashout command to the host accounting system.

18. The apparatus of claim 17, wherein the secondary control unit is operable to print out a voucher ticket and a transaction receipt associated with the paragaming event.

* * * * *

UNITED STATES PATENT AND TRADEMARK OFFICE

CERTIFICATE OF CORRECTION

PATENT NO. : 8,721,449 B2
APPLICATION NO. : 11/897533
DATED : May 13, 2014
INVENTOR(S) : Sam Johnson et al.

It is certified that error appears in the above-identified patent and that said Letters Patent is hereby corrected as shown below:

IN THE CLAIMS

In Claim 1, Column 17, Line 5, replace the second instance of “a” with --an--.
In Claim 1, Column 17, Line 41, delete the second instance of “the”.
In Claim 5, Column 17, Line 64, replace “transaction” with --process--.
In Claim 7, Column 18, Line 3, replace the second instance of “the” with --a--.
In Claim 8, Column 18, Line 6, delete the first instance of “the”.
In Claim 9, Column 18, Line 14, delete the first instance of “the”.
In Claim 11, Column 18, Line 38, replace “the” with --an--.
In Claim 11, Column 18, Line 40, after “;” insert --and--.
In Claim 11, Column 18, Line 46, replace the second instance of “the” with --an--.
In Claim 11, Column 18, Line 47, between “said” and “gaming” insert --electronic--.
In Claim 11, Column 18, Line 55, replace “the” with --an--.
In Claim 11, Column 18, Line 55, replace “receive” with --receiving--.
In Claim 11, Column 18, Line 60, delete the second instance of “the”.
In Claim 11, Column 18, Line 63, replace “notifying” with --notify--.
In Claim 12, Column 18, Line 67, replace “a” with --the--.
In Claim 12, Column 19, Line 3, replace “a” with --the--.
In Claim 13, Column 19, Line 6, replace “a” with --the--.
In Claim 14, Column 19, Line 10, replace “a” with --the--.
In Claim 14, Column 19, Line 11, replace “a” with --the--.
In Claim 15, Column 19, Line 16, replace “being” with --is--.
In Claim 15, Column 19, Line 18, replace “a” with --the--.
In Claim 17, Column 20, Line 11, replace “a” with --the--.

Signed and Sealed this
Fifth Day of April, 2016

Michelle K. Lee

Michelle K. Lee
*Director of the United States Patent and Trademark Office*